US012800706B2

(12) United States Patent
Park et al.

(10) Patent No.: US 12,800,706 B2
(45) Date of Patent: Nov. 17, 2026

(54) RADAR DEVICE FOR VEHICLE, CONTROL METHOD THEREOF AND VEHICLE INCLUDING THE SAME

(71) Applicant: HL KLEMOVE CORP., Incheon (KR)

(72) Inventors: Jong Gyu Park, Gyeonggi-do (KR); Hyeon Dong Cho, Gyeonggi-do (KR); Hanyeol Yu, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 627 days.

(21) Appl. No.: 17/959,994

(22) Filed: Oct. 4, 2022

(65) Prior Publication Data

US 2023/0408633 A1 Dec. 21, 2023

(30) Foreign Application Priority Data

Jun. 20, 2022 (KR) ........................ 10-2022-0074870

(51) Int. Cl.
*G01S 7/02* (2006.01)
*G01S 13/931* (2020.01)

(52) U.S. Cl.
CPC .......... *G01S 7/0235* (2021.05); *G01S 13/931* (2013.01)

(58) Field of Classification Search
CPC ....... G01S 7/0235; G01S 13/931; G01S 13/87
See application file for complete search history.

(56) References Cited

U.S. PATENT DOCUMENTS 12,204,043 B2 * 1/2025 Xu ........................ G01S 7/0235
2018/0095162 A1 * 4/2018 Fetterman ............... G01S 7/023
2022/0144287 A1 * 5/2022 Seo ........................ G01S 7/0232
2022/0349985 A1 * 11/2022 Zhang .................... G01S 13/343
2024/0053467 A1 * 2/2024 Dvorecki .............. G01S 13/931
2024/0319326 A1 * 9/2024 Shalita .................... G01S 7/295

FOREIGN PATENT DOCUMENTS

JP 2770852 B2 * 7/1998 ............... G01S 7/36
KR 10-2020-0111768 9/2020
KR 10-2022-0064109 5/2022

OTHER PUBLICATIONS

Office Action dated Dec. 2, 2024 for Korean Patent Application No. 10-2022-0074870 and its English translation from Global Dossier.

* cited by examiner

*Primary Examiner* — Resha Desai
*Assistant Examiner* — Peter Davon Doze
(74) *Attorney, Agent, or Firm* — WOMBLE BOND DICKINSON (US) LLP

(57) ABSTRACT

The radar device for a vehicle according to an exemplary embodiment of the present invention includes an antenna part for transmitting a radar signal and receiving a reflected signal; and a signal processor for detecting a target by processing the radar signal and the reflected signal, wherein the signal processor may identify at least one radar device capable of generating frequency interference with the radar signal among a plurality of other radar devices based on a frequency operation range and a radar recognition range of the plurality of other radar devices mounted on the same vehicle, identify transmission information including transmission frequency information and transmission time information for the radar signal, and transmit the transmission information to the at least one radar device.

9 Claims, 5 Drawing Sheets

RADAR DEVICE FOR VEHICLE, CONTROL METHOD THEREOF AND VEHICLE INCLUDING THE SAME

CROSS-REFERENCE TO RELATED APPLICATION

This application claims priority to and the benefit of Korean Patent Application No. 10-2022-0074870, filed on Jun. 20, 2022, the disclosure of which is incorporated herein by reference in its entirety.

TECHNICAL FIELD

The present invention relates to a radar device for a vehicle, a control thereof and a vehicle including the same.

Background Art

As the autonomous driving (AD) and advanced driver assistance system (ADAS) technologies have been developed, the number of sensors mounted on one vehicle is increased.

Among these, for radars using electromagnetic waves, three radars have been mounted in order to sense the side surfaces and rear side under a condition in which one front radar is initially mounted, and recently, in order to reinforce the sensing of the side surfaces of the front side, it has reached a level in which five or more sensors are mounted.

Since radar is an active sensor that generates and transmits a specific frequency by itself and measures a signal that is reflected back by the transmitted energy on an object, a strong interference signal may be generated when a signal overlaps with a module generating the same signal.

However, until now, it has been assumed and designed so that a signal interfered from the outside may vary in position and the degree of interference over time according to the movement of a vehicle by focusing on avoiding interference with a plurality of unspecific radars introduced from the outside according to the movement of the vehicle.

On the other hand, interference between a plurality of radar devices mounted on the same vehicle may have periodicity by itself, and when interference signal avoidance logic having a similar structure is implemented, such as applying a change in time or a change in center frequency with respect to a predetermined scan period, there is a problem in that an interference phenomenon is not avoided and an interference phenomenon appears periodically or continuously.

DISCLOSURE

Technical Problem

An object of the present invention is to provide a radar device for a vehicle for minimizing frequency interference in a plurality of other radar devices mounted on the same vehicle, a control method thereof and a vehicle including the same.

Technical Solution

The radar device for a vehicle according to an exemplary embodiment includes an antenna part for transmitting a radar signal and receiving a reflected signal; and a signal processor for detecting a target by processing the radar signal and the reflected signal, wherein the signal processor may identify at least one radar device capable of generating frequency interference with the radar signal among a plurality of other radar devices based on a frequency operation range and a radar recognition range of the plurality of other radar devices mounted on the same vehicle, identify transmission information including transmission frequency information and transmission time information for the radar signal, and transmit the transmission information to the at least one radar device.

The signal processor may identify the transmission frequency information including at least one information of a frequency operation range of the radar signal, an increase/decrease direction of a chirp and a slope of a chirp.

The signal processor may identify the transmission time information including at least one information of a transmission period of the radar signal, whether to be transmitted and an expected transmission time.

The signal processor may identify the at least one radar device based on whether the frequency operation range and radar recognition range of the plurality of other radar devices overlap with the frequency operation range and radar recognition range of the antenna part.

The radar signal may be a first radar signal, wherein the transmission information including the transmission frequency information and the transmission time information may be first transmission information including first transmission frequency information and first transmission time information, and wherein the signal processor may receive second transmission information including second transmission frequency information and second transmission time information for at least one second radar signal transmitted by the at least one radar device, and adjust the first transmission information based on the second transmission information.

The signal processor may compare the first transmission frequency information with the second transmission frequency information including at least one information of a frequency operation range of the at least one second radar signal, an increase/decrease direction of a chirp and a slope of a chirp to adjust the first transmission information so as to avoid frequency interference.

The signal processor may compare the first transmission frequency information with the second transmission frequency information including at least one information of a transmission period of the at least one second radar signal, whether to be transmitted and an expected transmission time to adjust the first transmission information so as to avoid frequency interference.

The method for controlling a radar device for a vehicle according to an exemplary embodiment includes the steps of: identifying at least one radar device capable of generating frequency interference with the radar device among a plurality of other radar devices based on a frequency operation range and a radar recognition range of the plurality of other radar devices mounted on the same vehicle; identifying transmission information including transmission frequency information and transmission time information for a radar signal transmitted by the radar device; and transmitting the transmission information to the at least one radar device.

The step of identifying the transmission information may include a step of identifying the transmission frequency information including at least one information of a frequency operation range of the radar signal, an increase/decrease direction of a chirp and a slope of a chirp.

The step of identifying the transmission information may include a step of identifying the transmission time information including at least one information of a transmission period of the radar signal, whether to be transmitted and an expected transmission time.

The step of identifying the at least one radar device may include a step of identifying the at least one radar device based on whether the frequency operation range and radar recognition range of the plurality of other radar devices overlap with the frequency operation range and radar recognition range of the radar device.

The radar signal may be a first radar signal, and the transmission information including the transmission frequency information and the transmission time information may be first transmission information including first transmission frequency information and first transmission time information, and the method may further include the steps of receiving second transmission information including second transmission frequency information and second transmission time information for at least one second radar signal transmitted by the at least one radar device; and adjusting the first transmission information based on the second transmission information.

The step of adjusting the first transmission information may include a step of comparing the first transmission time information with the second transmission time information including at least one information of a frequency operation range of the at least one second radar signal, an increase/decrease direction of a chirp and a slope of a chirp to adjust the first transmission information so as to avoid frequency interference.

The step of adjusting the first transmission information may include a step of comparing the first transmission time information with the second transmission time information including at least one information of a transmission period of the at least one second radar signal, whether to be transmitted and an expected transmission time to adjust the first transmission information so as to avoid frequency interference.

The vehicle on which a plurality of radar devices are mounted according to an exemplary embodiment of the present invention may include a plurality of radar devices including a first radar device and a second radar device capable of generating frequency interference with the first radar device, wherein the first radar device includes a first antenna part for transmitting a first radar signal; and a first signal processor for identifying first transmission information including first transmission frequency information and first transmission time information for the first radar signal, and transmitting the first transmission information to the second radar device, and wherein the second radar device includes a second antenna part; and a second signal processor for adjusting second transmission information including second transmission frequency information and second transmission time information based on the first transmission information received from the first radar device.

Advantageous Effects

According to an exemplary embodiment of the present invention, it is possible to actively avoid frequency interference between radar devices installed in the same vehicle.

According to an exemplary embodiment of the present invention, it is possible to prevent an unintentional interference signal from being introduced in advance.

MODES OF THE INVENTION

Figure 1:
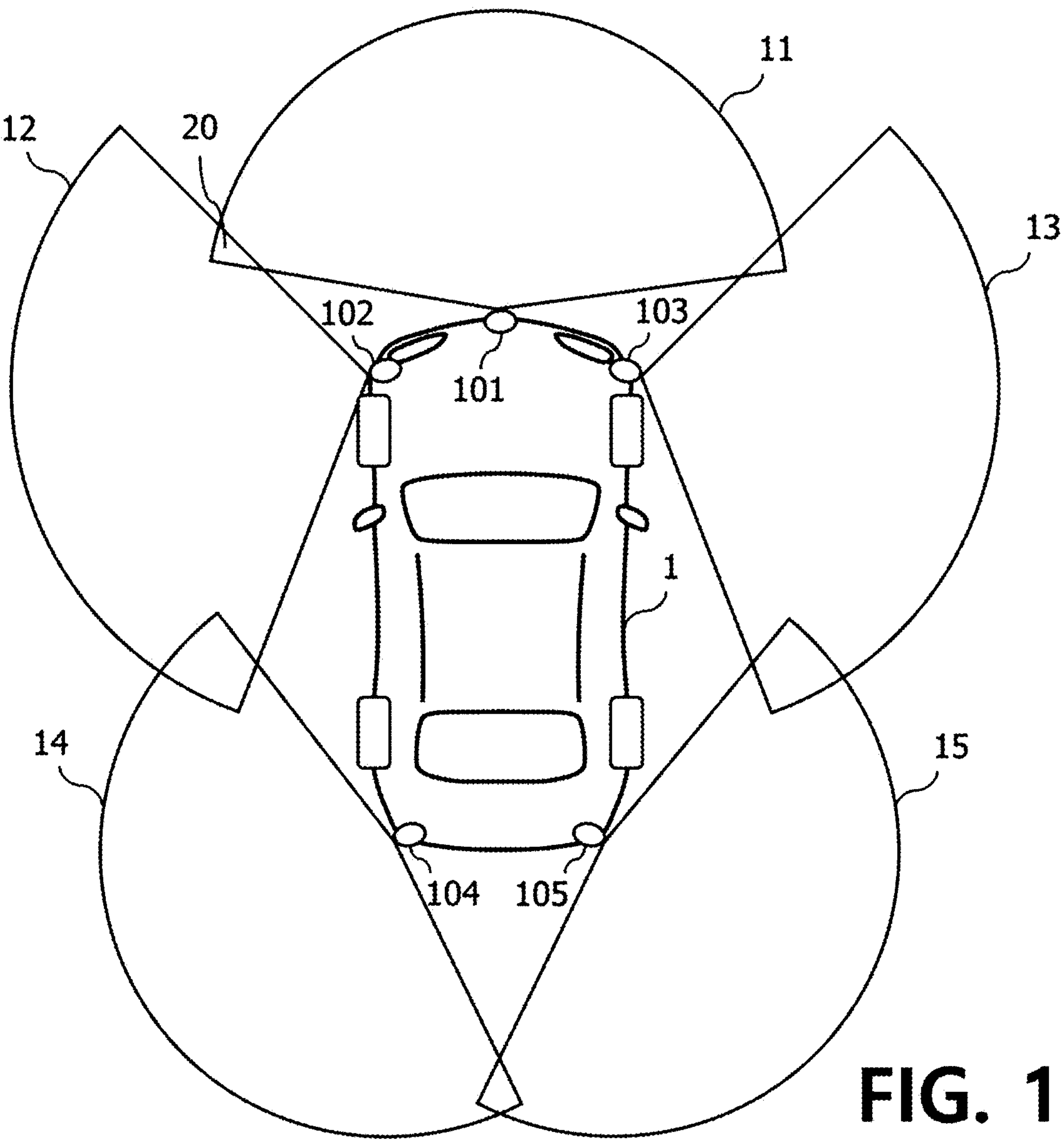
FIG. 1 is a diagram illustrating a vehicle on which a plurality of radar devices according to an exemplary embodiment of the present invention are mounted.

Hereinafter, preferred exemplary embodiments according to the present invention will be described in detail with reference to the accompanying drawings. The detailed description set forth below in conjunction with the accompanying drawings is intended to describe exemplary embodiments of the present invention and is not intended to represent the only exemplary embodiments in which the present invention may be practiced. In order to clearly describe the present invention in the drawings, parts irrelevant to the description may be omitted, and the same reference numerals may be used for the same or similar components throughout the specification.

FIG. 1 is a diagram illustrating a vehicle on which a plurality of radar devices according to an exemplary embodiment of the present invention are mounted.

Referring to FIG. 1, a plurality of radar devices 101, 102, 103, 104, 105 mounted on a vehicle 1 are illustrated. In this case, the mounting positions or number of the radar devices 101, 102, 103, 104, 105 illustrated in FIG. 1 and the recognition ranges 11, 12, 13, 14, 15 of each radar device are only examples and do not limit the present invention.

Each radar device has a frequency operation range and a radar recognition range. The frequency operation range means the frequency range of a radar signal and a reflected signal transmitted and received by each radar device, and the radar recognition range means a range in which a target can be detected by processing a reflected signal corresponding to the transmitted radar signal.

For example, the radar device 101 has a frequency operation range of 76 GHz to 77 GHz and a radar recognition range 11.

In the present invention, it is considered that interference may occur when a plurality of radar devices 101, 102, 103, 104, 105 overlap each other's frequency operation ranges and radar recognition ranges 11, 12, 13, 14, 15.

For example, it is assumed that the radar device 101 has a frequency operation range of 76 GHz to 77 GHz and a radar recognition range 11, and the radar device 102 has a frequency operation range of 76 GHz to 77 GHz and a radar recognition range 12. In this case, the radar device 101 and the radar device 102 may cause interference in an area 20.

As such, when interference occurs between radar devices that are mounted on the same vehicle, a period may occur in the interference due to the characteristics of moving together and transmitting and receiving radar signals. Therefore, the present invention proposes a design method for actively avoiding each other by exchanging transmission information with each other.

Hereinafter, the configuration and operation of a radar device according to an exemplary embodiment of the present invention will be described in detail with reference to the drawings.

Figure 2:
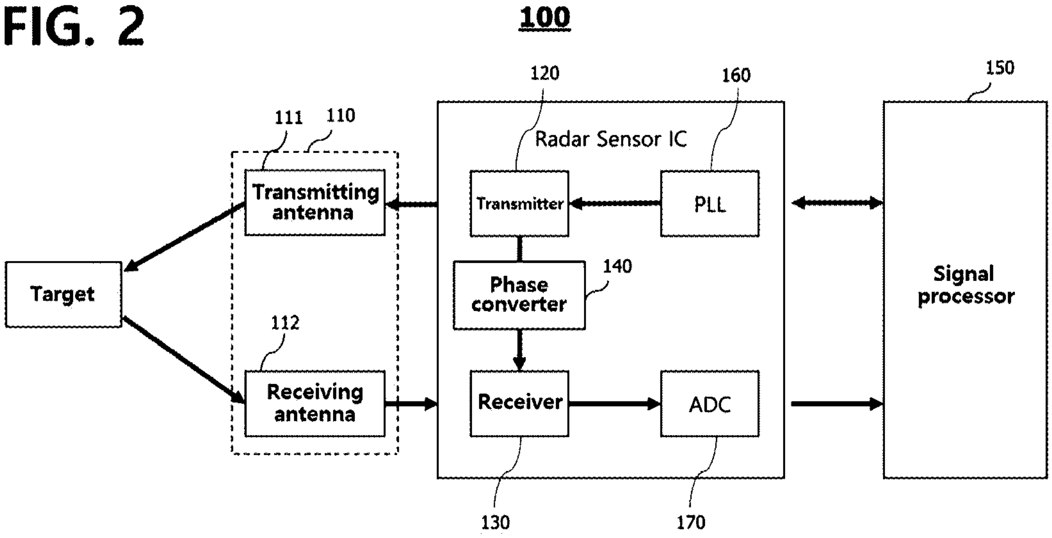
FIG. 2 is a block diagram illustrating the configuration of a radar device according to an exemplary embodiment of the present invention.

FIG. 2 is a block diagram illustrating the configuration of a radar device according to an exemplary embodiment of the present invention.

Referring to FIG. 2, the radar device 100 for a vehicle (hereinafter, referred to as a radar device 100) according to an exemplary embodiment of the present invention may include an antenna part 110, a transmitter 120, a receiver 130, a phase shift converter 140, a signal processor 150, a phase locked loop (PLL) 160 and an analog-digital converter (ADC) 170. In this case, the plurality of radar devices 101, 102, 103, 104, 105 illustrated in FIG. 1 are all represented as bar radar devices 100 having the same configuration.

According to an exemplary embodiment of the present invention, the vehicle on which the radar device 100 is mounted is not limited to any one such as a car, a motorcycle or the like, and the radar device 100 may be installed in the front, rear or side of the vehicle, and is not limited to the installation location thereof.

According to an exemplary embodiment of the present invention, the antenna part 110 includes a plurality of transmitting antennas 111 and a plurality of receiving antennas 112 formed of array antennas. In this case, the antenna part 110 may be implemented by being disposed on a PCB substrate.

The transmitter 120, the receiver 130, the PLL 160 and the ADC 170 may be implemented together as a radar sensor IC, but the arrangement structure or configuration thereof is not limited thereto.

According to an exemplary embodiment of the present invention, the transmitter 120 transmits a radar signal through a plurality of transmit antennas 111. In this case, the radar signal is transmitted in the form of a plurality of chirps (compressed high-intensity radiated pulse) through each transmitting antenna.

According to an exemplary embodiment of the present invention, the transmitter 120 may generate a very high-frequency signal in the form of a frequency modulation continuous wave (FMCW) under the control of the signal processor 150. The very high-frequency signal according to an exemplary embodiment of the present invention may be a chirp-type radar signal. Most signals change in amplitude with time, but a chirp refers to a signal whose frequency changes with time.

Although not illustrated in FIG. 2, the transmitter 120 may further include an oscillator such as a local oscillator for generating a radar signal.

According to an exemplary embodiment of the present invention, the receiver 130 receives a reflected signal which is the radar signal reflected from the target through a plurality of receiving antennas 112. In this case, a plurality of reflected signals corresponding to the radar signals transmitted in the form of a plurality of chirps are received.

In addition, although not illustrated in FIG. 2, the receiver 130 may further include a low noise amplifier (LNA) for low-noise amplifying the reflected signal received through the receiving antenna 112, a mixer for mixing the low-noise amplified reflected signal, and an amplifier for amplifying the mixed reflected signal. In this case, the ADC 170 digitally converts the amplified reflected signal to generate received data, and transmits the same to the signal processor 150.

According to an exemplary embodiment of the present invention, the phase converter 140 converts the phase of a local oscillation signal transmitted from the transmitter 120 to the receiver 130. According to an exemplary embodiment of the present invention, the phase shift of the phase converter 140 may be controlled by the signal processor 150.

According to an exemplary embodiment of the present invention, the signal processor 150 may be a micro control unit (MCU) or a microprocessor, and performs an overall operation of controlling the radar device 100.

When the signal processor 150 transmits a control command to the radar sensor circuit, a radar signal corresponding to the control command is generated through the PLL 160 and the transmitter 120 and transmitted to the transmitting antenna 111. In this case, the PLL 160 is a system for controlling an output signal by using a phase difference between the input signal and the signal fed back from the output signal, and performs frequency adjustment of the output signal according to the signal input from the signal processor 150.

The radar signal transmitted through the transmitting antenna 111 is reflected by hitting a target and transmitted to the receiving antenna 112. The receiver 130 receives the reflected signal through the receiving antenna 112 and transmits it to the ADC 170. The ADC 170 converts the reflected signal back into a digital signal and transmits it to the signal processor 150. The signal processor 150 may identify target information such as the position, angle and distance of a target by using the received signal.

According to an exemplary embodiment of the present invention, the signal processor 150 may transmit a radar signal in a specific operating frequency band through a plurality of transmitting antennas 111, and receive the reflected signal that returns after the radar signal hits a target through a plurality of receiving antennas 112.

According to an exemplary embodiment of the present invention, the signal processor 150 may identify at least one radar device that may generate frequency interference with a radar signal (hereinafter, referred to as a first radar signal) transmitted by the radar device 100 among a plurality of other radar devices. The plurality of other radar devices are mounted on the same vehicle with the radar device 100. The signal processor 150 may identify the at least one radar device based on a frequency operation range and a radar recognition range of the plurality of other radar devices, and transmit transmission information for a first radar signal to at least one radar device.

According to an exemplary embodiment of the present invention, the signal processor 150 may receive second transmission information including second transmission frequency information and second transmission time information for at least one second radar signal transmitted from at least one radar device by at least one radar device, and adjust the first transmission information based on the second transmission information.

In addition to the above, although not illustrated in FIG. 2, the radar device 100 may further include a feeding part having a feeding line for connecting the antenna part 110 and the signal processor 150, and the feeding line may be provided in plurality to respectively connect a plurality of transmitting antennas 111 and a plurality of receiving antennas 112 to the signal processor 150.

Hereinafter, the process for avoiding interference between a plurality of radar devices mounted on the same vehicle in the present invention will be described in detail.

Figure 3:
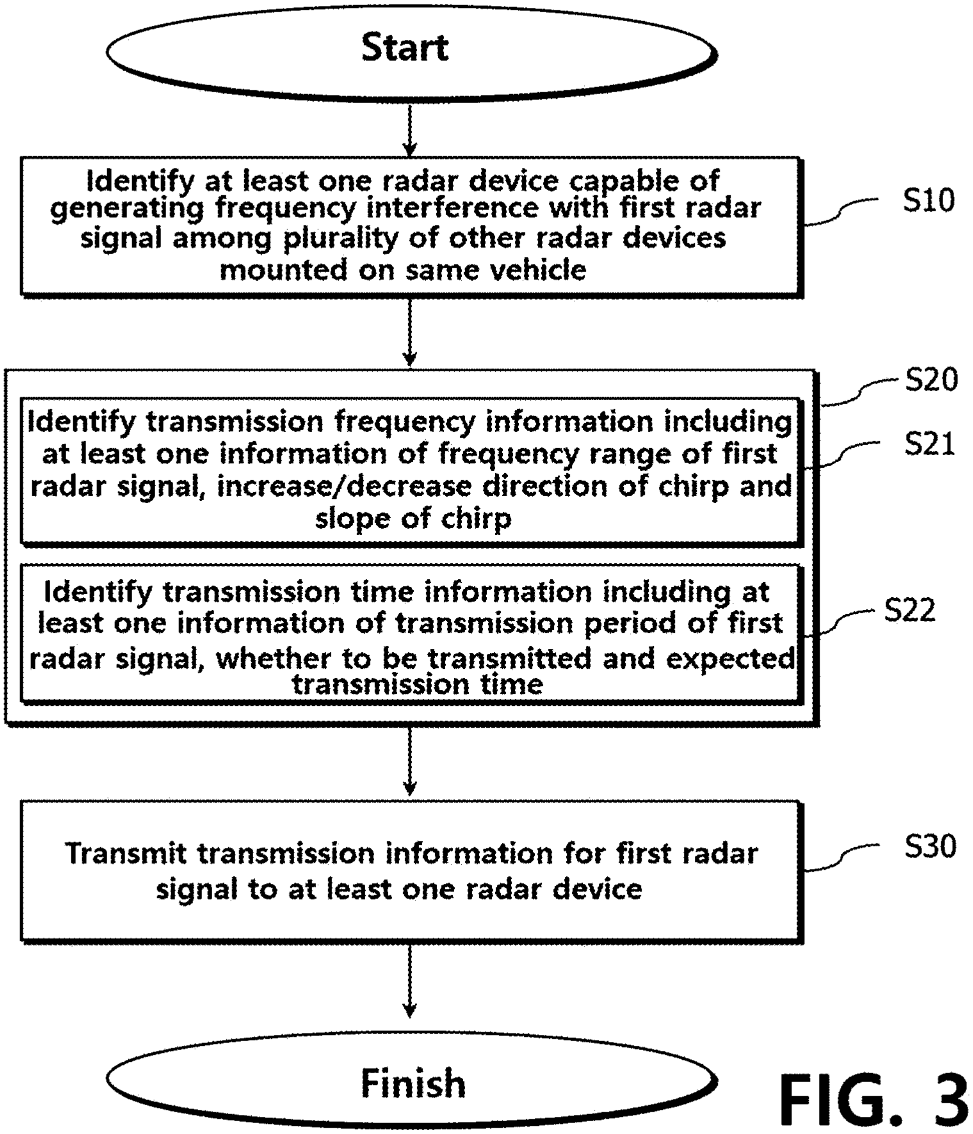
FIG. 3 is a diagram illustrating the operation flowchart of a radar device according to a first example of the present invention.

FIG. 3 is a diagram illustrating the operation flowchart of a radar device according to a first example of the present invention.

In the first example of the present invention, the operation in which the radar device 100 transmits transmission information to other radar devices capable of generating frequency interference will be described.

According to an exemplary embodiment of the present invention, the signal processor 150 identifies at least one radar device capable of generating frequency interference with a first radar signal of the radar device 100 among a plurality of other radar devices based on the frequency operation range and radar recognition range of the plurality of other radar devices mounted on the same vehicle (S10).

The present invention is an invention to avoid interference between radar devices installed in the same vehicle, and hereinafter, it is defined that a plurality of other radar devices mean only the radar devices installed in the same vehicle.

According to an exemplary embodiment of the present invention, the signal processor 150 attempts to identify at least one radar device capable of generating frequency interference with the radar device 100 among the plurality of other radar devices. This is to avoid interference by transmitting its own transmission information to a target causing frequency interference with respect to the radar device 100.

As described above with reference to FIG. 1, each radar device has a frequency operation range and a radar recognition range. The signal processor 150 may identify whether the frequency operation range and the radar recognition range of a plurality of other radar devices overlap with the frequency operation range and the radar recognition range of the antenna part 110.

In this case, the signal processor 150 may receive information about a frequency operation range and a radar recognition range from a plurality of other radar devices in order to identify at least one radar device capable of generating frequency interference with the radar device 100. However, the present invention is not limited thereto, and it may receive information on a combination of radar devices generating mutual frequency interference from a plurality of radar devices including the radar device 100.

According to an exemplary embodiment of the present invention, the signal processor 150 identifies transmission information including transmission frequency information and transmission time information for a first radar signal (S20).

According to an exemplary embodiment of the present invention, the transmission frequency information is information about the frequency of a radar signal, and includes at least one information of the frequency operation range of a radar signal, the increase/decrease direction of a chirp and the slope of a chirp.

The frequency operation range is the same as the frequency operation range used to identify whether there is interference between the radar devices in S10. The increase/decrease direction of a chirp may indicate whether the chirp is an up-chirp or a down-chirp, and the slope of a chirp may indicate an increase in frequency per time.

According to an exemplary embodiment of the present invention, the transmission time information is information about a time when the radar device transmits a frequency, and may include at least one information of the transmission period of a radar signal, whether to be transmitted and an expected transmission time.

Due to the characteristics of the radar device, a part of the transmission period is used to transmit a signal, and the rest is used to process the signal. Accordingly, whether to be transmitted may mean whether the antenna part is currently transmitting a radar signal or the signal processor is processing a signal.

The expected transmission time of a radar signal may include not only the transmission time of the next period of the signal transmitted according to the period, but also the remaining time until the start of the next transmission period.

The signal processor 150 may identify the transmission frequency information (hereinafter, referred to as first transmission frequency information) including at least one information of the frequency operation range of a first radar signal, the increase/decrease direction of a chirp and the slope of a chirp (S21).

The signal processor 150 may identify transmission time information (hereinafter, referred to as first transmission time information) including at least one information of the transmission period of a first radar signal, whether to be transmitted and an expected transmission time (S22).

According to an exemplary embodiment of the present invention, the signal processor 150 transmits transmission information for the first radar signal to at least one radar device (S30).

The signal processor 150 may transmit transmission information including at least one of transmission frequency information and transmission time information to at least one radar device.

In this case, the radar device 100 and the at least one radar device may be mounted on the same vehicle to perform internal communication, and the signal processor 150 may transmit transmission information to other radar devices by using the CAN (controller area network) communication, LIN (local interconnect network) communication and the like.

According to an exemplary embodiment of the present invention, it is possible to avoid frequency interference based on the transmission information by transmitting its own transmission information to another radar device that is likely to cause frequency interference with itself. The avoidance operation will be described in more detail with reference to FIG. 4. According to an exemplary embodiment of the present invention, it is possible to prevent an unintentional interference signal from being introduced in advance.

Figure 4:
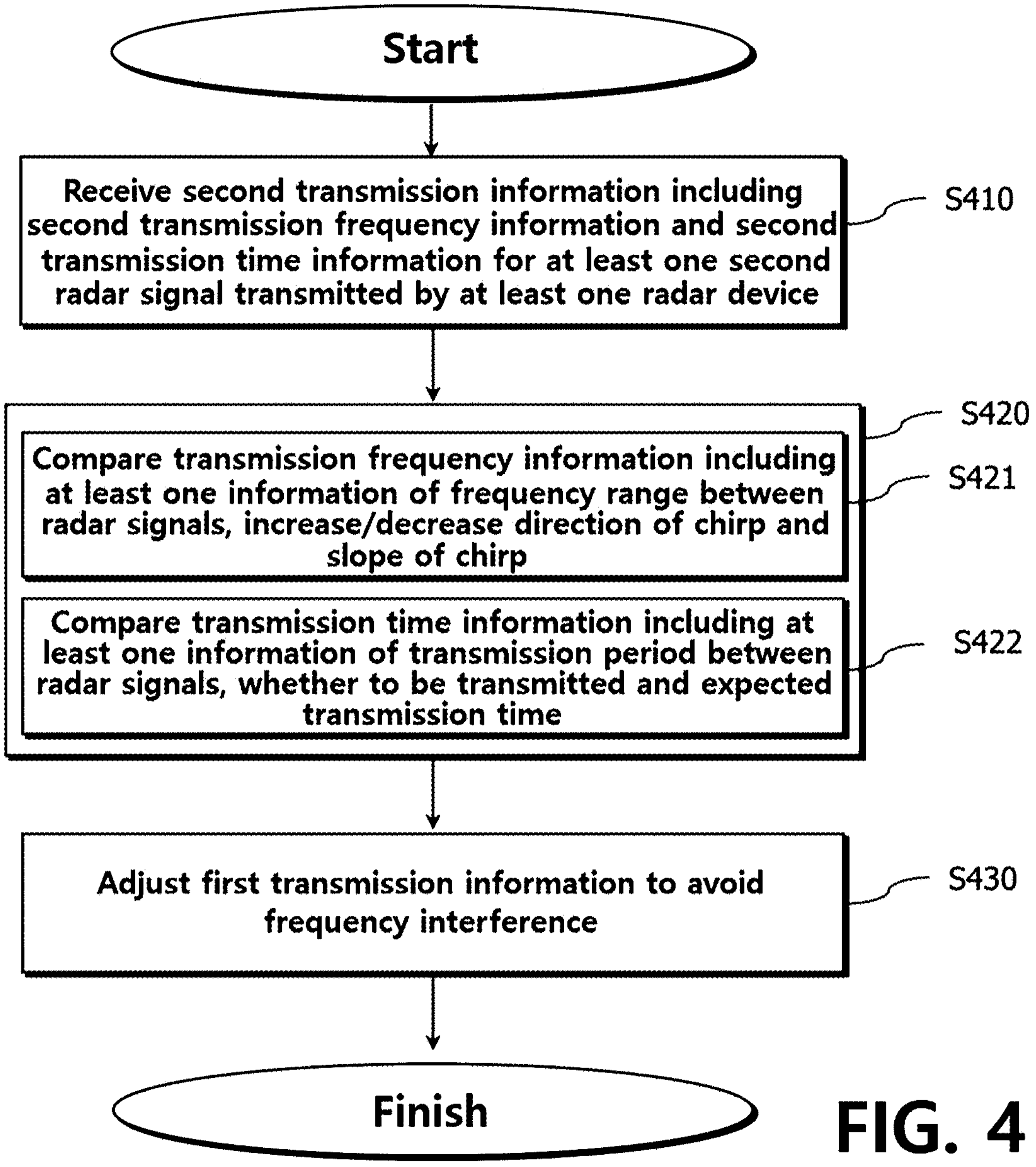
FIG. 4 is a diagram illustrating the operation flowchart of a radar device according to a second example of the present invention.

FIG. 4 is a diagram illustrating the operation flowchart of a radar device according to a second example of the present invention.

In the second example of the present invention, the operation in which the radar device 100 adjusts the first transmission information of a first radar signal by using the second transmission information received from another radar device capable of generating frequency interference will be described.

According to an exemplary embodiment of the present invention, the signal processor 150 receives second transmission information including second transmission frequency information and second transmission time information for at least one second radar signal transmitted by at least one radar device (S410).

In this case, at least one radar device refers to a radar device (hereinafter, also referred to as a second radar device) capable of generating frequency interference with the first radar signal among a plurality of other radar devices.

There may be a plurality of second radar devices capable of generating frequency interference with the radar device 100. When there are a plurality of second radar devices, the signal processor 150 may receive second transmission information including second transmission frequency information and second transmission time information from each of the plurality of second radar devices.

According to an exemplary embodiment of the present invention, the signal processor 150 may compare the first transmission information and the second transmission information (S420).

More specifically, the signal processor 150 may compare the first transmission frequency information with the second transmission frequency information including at least one information of the frequency operation range of at least one second radar signal, the increase/decrease direction of a chirp and the slope of a chirp (S421).

For example, the signal processor 150 receives the second transmission frequency information including information that the frequency operation range of a second radar signal is 76 GHz to 77 GHz, and the increase/decrease direction of a chirp is up-chirp, and it is assumed that the frequency operation range is 76 GHz to 77 GHz. It can be seen that the signal processor 150 has a frequency operation range similar to that of the second radar device.

Alternatively, the signal processor 150 may compare the first transmission time information with the second transmission time information including at least one information of the transmission period a second radar signal, whether to be transmitted and an expected transmission time (S422).

For example, the signal processor 150 receives the second transmission time information including information that the transmission period of a second radar signal is 50 ms, and 40 ms remain until the next transmission period, and it is assumed that the transmission period of a first radar signal is 40 ms, and 40 ms remain until the next period.

It can be seen that the signal processor 150 transmits a signal simultaneously with the second radar device in the next period, or transmits a signal simultaneously with the second radar device every 5 cycles (every 200 ms) of the first radar signal.

According to an exemplary embodiment of the present invention, the signal processor 150 may adjust the first transmission information so as to avoid frequency interference with the second radar device based on the second transmission information (S420).

For example, the signal processor 150 receives the second transmission frequency information including information that the frequency operation range of a second radar signal is 76 GHz to 77 GHz, and the increase/decrease direction of a chirp is up-chirp, and it is assumed that the frequency operation range is 76 GHz to 77 GHz. The signal processor 150 may adjust the increase/decrease direction of the chirp of the first radar signal to a down chirp to avoid frequency interference with the second radar device.

Alternatively, the signal processor 150 receives the second transmission time information including the information that the transmission period of a second radar signal is 50 ms, and 40 ms remain until the next transmission period, and it is assumed that the transmission period of a first radar signal is 40 ms, and 40 ms remain until the next period. The signal processor 150 may set the transmission start time of the first radar signal to be deviated from the second radar signal. In addition, the signal processor 150 may continuously adjust the transmission start time or the transmission period at any time in order to prevent a period from occurring in the interference signal.

According to an exemplary embodiment of the present invention, it is possible to actively avoid frequency interference by adjusting its own transmission information based on the transmission information of other radar devices that may cause frequency interference.

Figure 5:
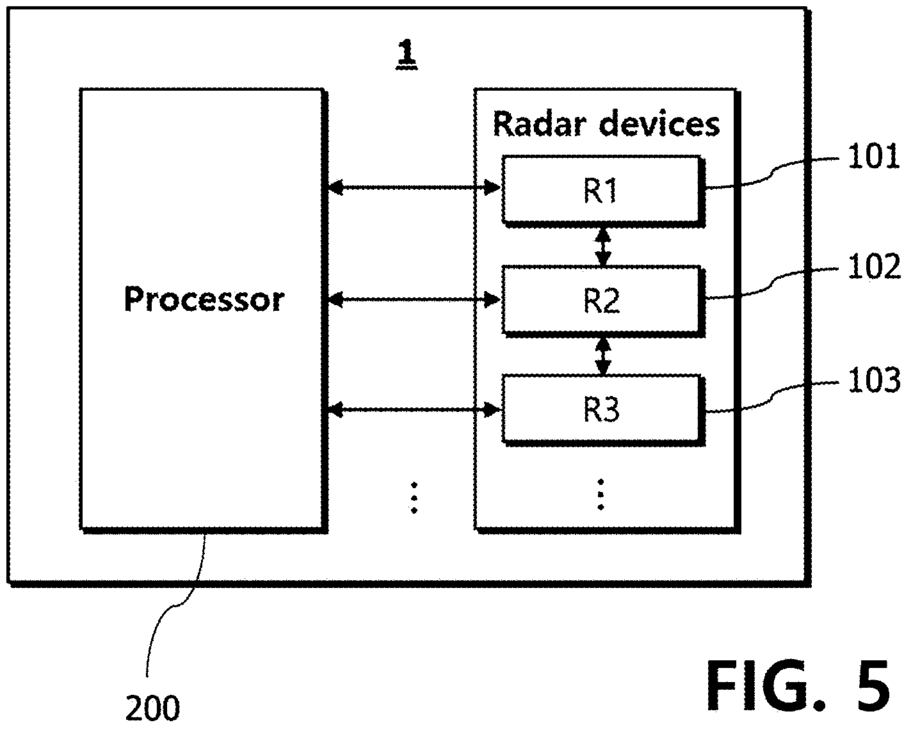
FIG. 5 is a block diagram illustrating the configuration of a vehicle on which a plurality of radar devices according to an exemplary embodiment of the present invention are mounted.

FIG. 5 is a block diagram illustrating the configuration of a vehicle on which a plurality of radar devices according to an exemplary embodiment of the present invention are mounted.

The vehicle 1 according to an exemplary embodiment of the present invention may include a plurality of radar devices 101, 102, 103, . . . and a processor 200.

In this drawing, the operation between two radar devices (hereinafter, referred to as a first radar device and a second radar device) capable of generating frequency interference among a plurality of radar devices 101, 102, 103, . . . will be described.

The first radar device may include a first antenna part for transmitting a first radar signal and a first signal processor.

The first signal processor may identify the first transmission information including the first transmission frequency information and the first transmission time information for a first radar signal, and transmit the transmission information to the second radar device.

The second radar device may include a second antenna part and a second signal processor.

The second signal processor may adjust the second transmission information including the second transmission frequency information and the second transmission time information based on the first transmission information received from the first radar device.

Meanwhile, the processor 200 according to an exemplary embodiment of the present invention is a central control device and may be involved in overall vehicle control such as brake, acceleration, collision detection and the like, as well as control of the radar device.

The operations described above with reference to FIGS. 1 to 4 may be performed by the signal processor inside the radar device, but since they include operations between radar devices, some or all operations may be performed through the processor 200.

That is, although the process of any one radar device identifying another radar device generating frequency interference may be performed by the signal processor of each radar device as describe above, the present invention is not limited thereto, and it may be performed by the processor 200 of a vehicle 1.

For example, the processor 200 may receive information about a frequency operation range and a radar recognition range from a plurality of radar devices, and identify information about a combination of radar devices that generate mutual frequency interference among the plurality of radar devices.

Alternatively, the processor 200 may receive transmission information including transmission frequency information and transmission time information for a radar signal transmitted by each radar device from a plurality of radar devices, and identify information to be adjusted by any one radar device so as to avoid frequency interference based on a plurality of transmission information and transmit the information to the corresponding radar device.

According to an exemplary embodiment of the present invention, when the processor is involved the frequency interference avoidance, the backup function of the signal processor in the radar device may be performed, and the scope of application of the present invention may be broadened. The processor having a larger memory and arithmetic function may reduce the load on the computational amount of the signal processor and contribute to an increase in processing speed.

EXPLANATION OF REFERENCE NUMERALS

1: Vehicle
100: Radar device

110: Antenna part
120: Transmitter
130: Receiver
140: Phase converter
150: Signal processor
160: Phase locked loop
170: Converter

The invention claimed is:

1. A radar device for a vehicle, comprising:
an antenna part for transmitting a first radar signal and receiving a reflected signal; and
a signal processor for detecting a target by processing the first radar signal and the reflected signal,
wherein the signal processor configured to:
identify another radar device mounted on the same vehicle, the other radar device being capable of generating a second radar signal,
identify first transmission information including first transmission start time or first transmission period,
receive second transmission information including second transmission start time or second transmission period from the other radar device,
identify the other radar device based on whether the frequency operation range and radar recognition range of the other radar device overlap with the frequency operation range and radar recognition range of the antenna part, and
adjust the first transmission start time based on the second transmission start time, or the first transmission period based on the second transmission period,
wherein the signal processor repeatedly performs the adjustment at arbitrary times to prevent periodic interference between the first radar signal and the second radar signal,
wherein the radar device and the other radar device are mounted on the same vehicle,
wherein the radar device and the other radar device exchange the first transmission information and second transmission information to actively avoid mutual interference by using controller area network (CAN) communication.

2. The radar device of claim 1, wherein the first transmission information further includes a frequency operation range of the first radar signal, an increase/decrease direction of a chirp, and a slope of a chirp.

3. The radar device of claim 1,
wherein the first transmission information further includes first transmission frequency information,
wherein the second transmission information further includes second transmission frequency information,
wherein the signal processor is further configured to control the antenna part to adjust the first transmission information based on the second transmission information so as to avoid frequency interference.

4. The radar device of claim 3, wherein the signal processor is further configured to compare the first transmission frequency information with the second transmission frequency information to adjust the first transmission information so as to avoid frequency interference, each of the first transmission information and the second transmission information includes an increase/decrease direction of a chirp and a slope of a chirp.

5. A method for controlling a radar device, the radar device generating a first radar signal, for a vehicle, comprising:
identifying another radar device mounted on the same vehicle, the other radar device being capable of generating a second radar signal;
identifying first transmission information including first transmission start time or first transmission period;
receiving second transmission information including second transmission start time or second transmission period from the other radar device;
identifying the other radar device based on whether the frequency operation range and radar recognition range of the other radar device overlap with the frequency operation range and radar recognition range of the antenna part, and
adjusting the first transmission start time based on the second transmission start time, or the first transmission period based on the second transmission period,
wherein the adjusting is performed repeatedly at arbitrary times to prevent periodic interference between the first radar signal and the second radar signal,
wherein the radar device and the other radar device are mounted on the same vehicle,
wherein the radar device and the other radar device exchange the first transmission information and the second transmission information to actively avoid mutual interference by using controller area network (CAN) communication.

6. The method of claim 5, wherein the first transmission information further includes a frequency operation range of the first radar signal, an increase/decrease direction of a chirp and a slope of a chirp.

7. The method of claim 5,
wherein the first transmission information further includes first transmission frequency information,
wherein the second transmission information further includes second transmission frequency information,
wherein the method further comprises:
controlling an antenna part of the radar device to adjust the first transmission information based on the second transmission information so as to avoid frequency interference.

8. The method of claim 7, further comprising comparing the first transmission frequency information with the second transmission frequency information to adjust the first transmission information so as to avoid frequency interference;
wherein each of the first transmission information and the second transmission information includes an increase/decrease direction of a chirp and a slope of a chirp.

9. A vehicle on which a plurality of radar devices are mounted, comprising:
a plurality of radar devices including a first radar device and a second radar device capable of generating frequency interference with the first radar device,
wherein the first radar device comprises:
a first antenna part for transmitting a first radar signal; and
a first signal processor configured to identify first transmission information including first transmission start time or first transmission period for the first radar signal, and transmit the first transmission information to the second radar device; and
wherein the second radar device comprises:
a second antenna part; and
a second signal processor configured to:
identify the first radar device based on whether the frequency operation range and radar recognition range of the first radar device overlap with the frequency operation range and radar recognition range of the second the antenna part, and adjust second transmission start time based on the first transmission start time, or second transmission period based on the first transmission period, wherein the second signal processor repeatedly performs the adjustment at arbitrary times to prevent periodic interference between the first radar signal and the second radar signal, wherein the first radar device and the second radar device are mounted on the same vehicle, wherein the first radar device and the second radar device exchange the first transmission information and a second transmission information to actively avoid mutual interference by using controller area network (CAN) communication, the second transmission information including the second transmission start time or the second transmission period.

* * * * *